Dec. 11, 1945.   A. A. DE LORIMIER   2,390,520
APPARATUS FOR LOCATING FOREIGN BODIES
Filed June 21, 1943   2 Sheets-Sheet 1

Inventor
Alfred A. de Lorimier
Attorneys

Dec. 11, 1945.  A. A. DE LORIMIER  2,390,520
APPARATUS FOR LOCATING FOREIGN BODIES
Filed June 21, 1943  2 Sheets-Sheet 2

Inventor
Alfred A. de Lorimier

By
Attorneys

Patented Dec. 11, 1945

2,390,520

UNITED STATES PATENT OFFICE 2,390,520

APPARATUS FOR LOCATING FOREIGN BODIES

Alfred A. de Lorimier, United States Army, Memphis, Tenn.

Application June 21, 1943, Serial No. 491,640

5 Claims. (Cl. 33—189)

(Granted under the act of March 3, 1883, as amended April 30, 1928; 370 O. G. 757)

The invention described herein may be manufactured and used by or for the Government for governmental purposes, without payment to me of any royalty thereon.

This invention relates generally to the location of foreign objects embedded within the body of a patient, but more particularly to a means for locating the foreign objects in an additional plane to the one in which location has already been determined.

One object of the invention is to provide a simple and accurate means for obtaining the location of a foreign object embedded within the body of a patient, said location being in a different plane to one in which the object has already been located by other means; and for marking the body of the patient to identify the location of said object with respect to said plane.

Another object of the invention is to provide an easily and quickly operated device for obtaining a second location of foreign objects, without the use of X-rays, in a plane at right angles to the plane in which location has already been established.

Other objects of the invention will be apparent to those skilled in the art to which it relates by reference to the accompanying drawings which form a part of this specification.

Referring to the drawings, in which like parts are represented by similar reference characters:

Figure 1:
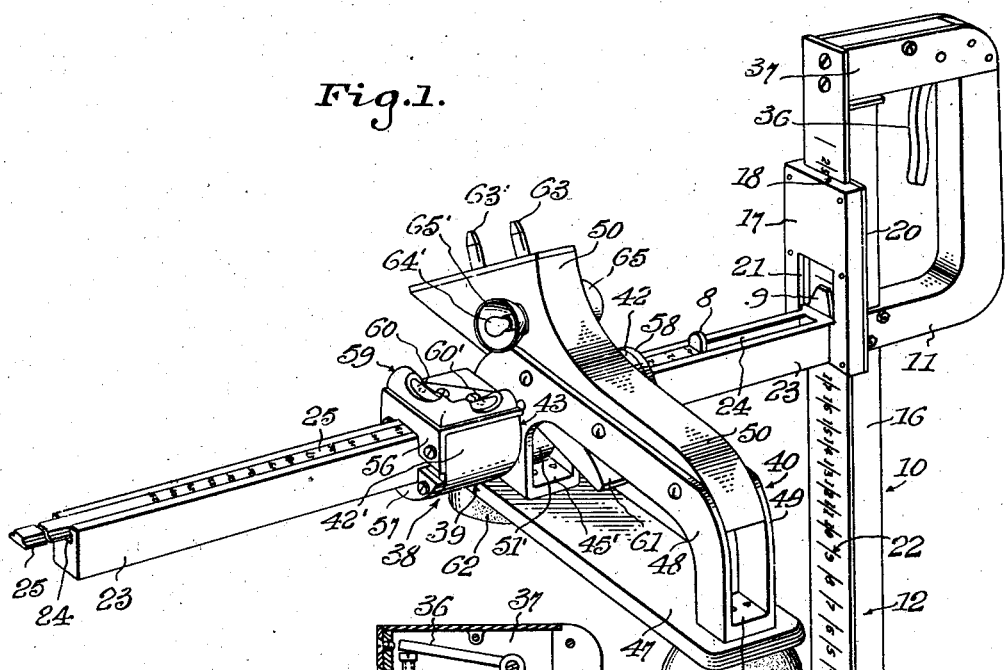
Fig. 1 is a perspective view showing the assembled device.
Figure 3:
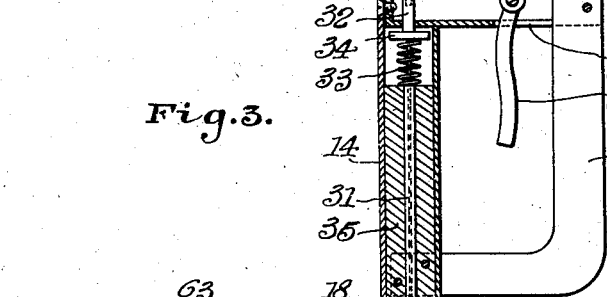
Fig. 3 is a partially sectionalized elevation taken on the line 3—3 of Fig. 2.
Figure 5:
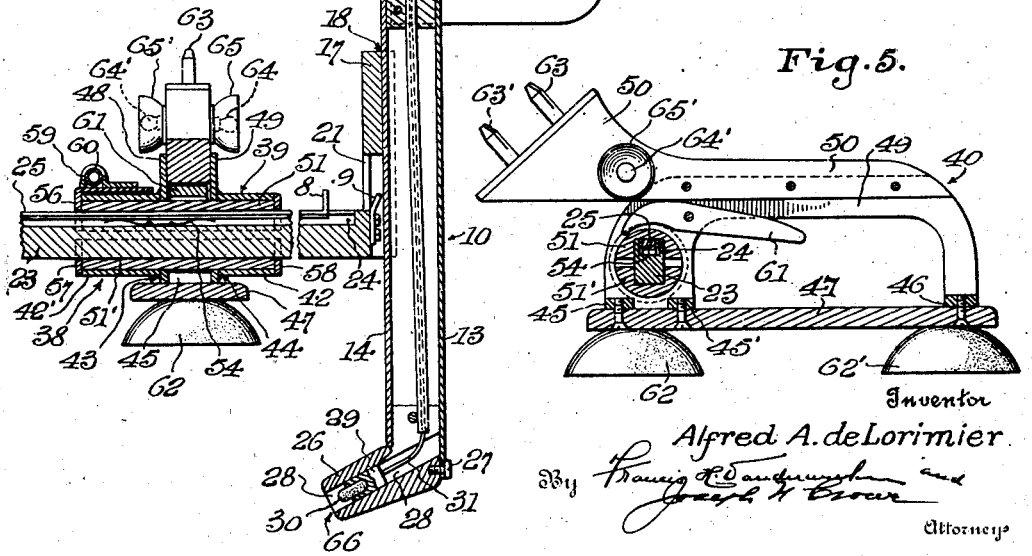
Fig. 5 is a side elevation of the horizontal slide member, partially sectionalized to show the means for clamping the same at any position along the horizontal arm.

After having located a foreign object embedded within the body of a patient, in a single plane, and having determined its distance from the skin of the patient in this plane, by any of the methods and apparatus used for this purpose, the surgeon may find it advantageous to locate the foreign object with respect to another plane in order to simplify the operation for its removal, and for this purpose the means which form the subject matter of this invention are utilized.

Briefly stated, the device comprises a measuring instrument by which the measurement of the depth of the object beneath the skin of the patient in one plane, as measured by X-ray or other devices designed for this purpose, can be utilized for obtaining the depth thereof beneath the skin of the patient in another plane.

Referring to Figs. 1, 2, 3 and 4, the numeral 10 designates the vertical measuring arm of the device. This arm is provided with a handle 11 which is attached at its upper extremity. The vertical arm comprises a standard 12 of rectangular cross-section which is formed by combining an elongated member of U-shaped cross-section 13 with a flat strip 14, the latter being graduated preferably in centimeters on its outer surface to form a scale 22.

Figure 2:
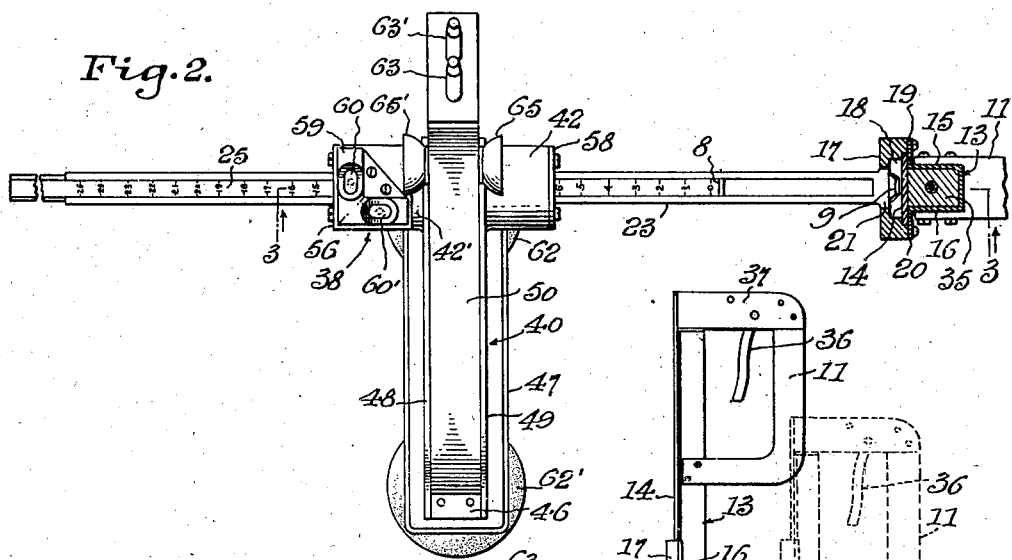
Fig. 2 is a top plan view of the device.

The flat graduated strip 14 projects sufficiently beyond the side walls 15 and 16 of the U-shaped member 13 to allow the attachment of a vertical slide member 17. This slide member is provided with a groove 18 which fits the graduated strip 14 and is retained thereto by longitudinal strips 19 and 20, as shown in Fig. 2.

Within the slide member 17 is a rectangular opening 21 into which projects the indicating member 9. The opening 21 functions as a window for observing the scale 22 on the strip 14. Beneath the opening 21 a horizontal leveling arm 23 is either attached to the slide 17 or formed integral therewith and projects at 90° therefrom.

The horizontal leveling arm 23 comprises a beam of rectangular cross-section provided with a longitudinal T-shaped groove 24 which retains a slidable scale member 25 graduated in centimeters. This scale is provided with a nib 8 at one end thereof which is bent upward at 90°.

Figure 8:
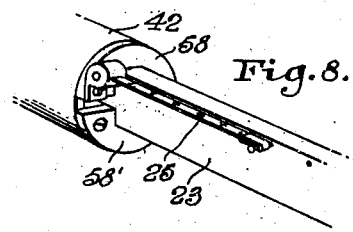
Fig. 8 is a perspective view showing a modified form of horizontal measuring scale.
Figure 6:
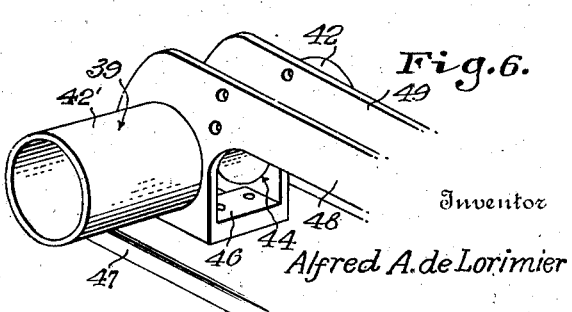
Fig. 6 is a perspective view of a portion of the slide member showing in detail the tubular casing which incloses clamping slides.

Instead of the type of scale designated by the numeral 25, a spool wound tape may be used as indicated by the numeral 25' in Fig. 8. The end of the tape can be attached to arm 23 and moved with it.

The vertical arm 10 which is provided with the scale 22 may be raised or lowered with respect to the horizontal arm 23 by passing it through the vertical slide member 17, and its relative position with respect to the horizontal member noted on the scale.

The vertical arm is provided with a lower end piece or marker foot 26 which is attached to the standard 13 and the scale strip 14 by the screws 27. This marker foot 26 projects at an angle of about 60° from the axis of the standard or vertical member 12 and is provided with a central passage 28 in which is slidably fitted a small piston 29 which is drilled at one end to retain a marking element 30. The piston 29 is attached to a Bowden wire 31 which extends through the standard 12 to a flanged piston 32. The piston 32 projects into the upper hollow vertical member 12, and is retained in an elevated position by a spring 33 which abuts the flange 34 of the piston 32 and an internally drilled filler member 35 which is retained within the standard and through which the Bowden wire 31 passes.

The piston 32 is depressed by means of a bell crank lever 36 which is pivotally mounted within the hollow upper member 37 of the handle 11, one arm of the lever projecting through the opening 37'. The bell crank, which is operated by finger pressure, projects the marker 30 beyond the extremity of the end piece 26 through the intermediate action of the pistons 29 and 32 and the Bowden wire 31.

Upon the horizontal arm 23 is mounted a leveling slide 38 which comprises a supporting sleeve 39, a handle 40, and an aligning plate 47. The supporting sleeve 39 consists of tubular members 42 and 42' which are welded or otherwise connected to the side members 48 and 49 of the handle. These tubular members 42 and 42' register with circular openings 43 and 44 at one end of the handle 40. The handle is of sheet metal bent centrally to form flat surfaces 45, 45' and 46 for attachment to the aligning plate 47 and to provide the upwardly extending side members 48 and 49 which attach to a gripping member 50.

Within the tubular supporting sleeve are located an upper and a lower clutch member 51 and 51' which are formed of longitudinally extending strips provided respectively with grooves 52 and 52' which slidably fit the horizontal arm 23. When the horizontal arm is slidably mounted between the clutch members 51 and 51' there is sufficient spacing between the latter to prevent them touching along their adjacent edges 52, 52' and 53, 53' and to allow them to grip the horizontal arm 23 to which they are fitted sufficiently tight to prevent too easy slippage. To the bottom of the groove 24 in the horizontal arm 23 is attached a spring 54 which retains the sliding scale member 25 in any position it is set.

Figure 7:
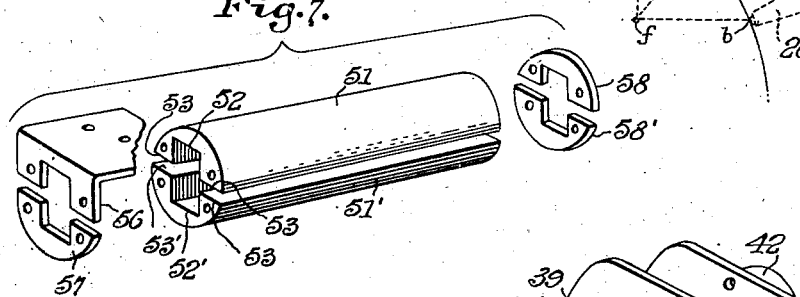
Fig. 7 is a perspective view showing the upper and lower clamping slides and their end retaining plates.

The clutch members 51 and 51' are retained within the tubular sleeve members 42 and 42' by means of the end pieces 56, 57 and 58, 58' which are shown in detail in Fig. 7 and are fixed by screws to the clutch members.

The end piece 56 is bent at a 90° angle and extends over a portion of the sleeve as shown in Figs. 1 to 4 and in detail in Fig. 7. To this upper extended portion is attached a double level indicator 59 provided with two liquid tubes 60 and 60' arranged at right angles to each other and adapted to indicate when the aligning plate is in a horizontal plane.

When desired, the horizontal leveling arm 23 may be prevented from turning and sliding within the sleeve 39 by means of a finger operated lever 61 which is pivotally mounted between the extending side members 48 and 49 and beneath the gripping member 50 of the handle 40.

Figure 4:
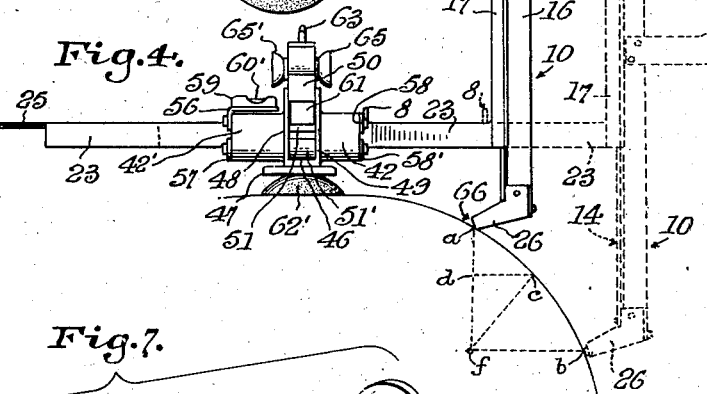
Fig. 4 is a side elevation showing the device in operative position.

To the bottom of the aligning plate 47 are attached rubber suction cups 62 and 62' to permit the attachment of the device to the body of the patient in the manner shown in Fig. 4.

The gripping member 50 is provided with electrical contacts 63 and 63' which fit a plug on an electrical extension cord (not shown). The contacts 63 and 63' are connected to small electric lamps 64 and 64' located on either side of the gripping member 50 and which are provided with reflectors 65 and 65'.

In the operation of the device, the handle 40 of the leveling slide 39 is held in one hand and the suction cups attached thereto are placed lightly upon the surface of the patient's body so that the leveling arm is in a substantially horizontal position. With the other hand, the handle 11 of the vertical measuring arm 10 is moved outwardly and vertically downward until the opening 66 of the end piece 26 is over the spot $a$ on the patient, this spot having been made to indicate the location of the foreign body $f$, which was found by X rays by any of the methods and apparatus usually employed for this purpose. Retaining the marker 66 on the spot $a$, the aligning plate is again adjusted for leveling purposes, if necessary, and the suction cups are then attached to the patient's body. Slight adjustments in leveling the aligning plate 47 may be effected after the attachment of the rubber suction cups owing to the flexibility of the cups and the flesh of the patient. After the horizontal arrangement of the aligning plate 47 and the vertical arrangement of the vertical measuring arm 10 while retaining marker opening 66 above the spot $a$, and with one hand holding the handle 40 of the aligning plate, the lever 61 is pressed to prevent the horizontal arm 23 from turning or sliding within the supporting sleeve 39, and the reading on the vertical scale 22 noted. The horizontal scale 25 is then set at zero by placing the nib 8 in contact with the plate 53, the lever 61 released, and the handle 11 moved outwardly and downwardly until the downward movement shows on the scale 22 a measurement equal to the distance $f-a$ that was found to be the depth of the foreign object beneath the skin in the direction parallel to the vertical scale, by the method and apparatus employing X rays as mentioned above. The trigger or bell crank lever 36 on the handle 11 of the vertical arm is then pressed to mark the patient's body at $b$, and the distance $f-b$ noted on the scale 25 which has been moved with the horizontal arm. This scale reading is a measurement of the distance of the foreign object from the newly made mark on the body of the patient, said distance being in a plane at right angles to the plane at which the initial measurement was made. In order to obtain a measurement from a point $c$ to the object $f$ in a plane at any other angle to the plane in which the original measurement was made, it is only necessary to obtain the measurements $cd$ and $af-ad$ which equals $fd$. The distance $cf$ can then be found by obtaining the length of the hypothenuse of the right angle triangle $fdc$.

In order to provide for durable construction most of the parts of the device can be made of metal but any other material which will be suitable for the purpose may be used. Any part of the device which may come in contact with the surface of the skin should be made of material which is a poor heat conductor to avoid chilling the patient.

It will be noted that the device can be used for either right-hand or left-hand operation, which depends on the direction in which the horizontal leveling arm 23 is inserted into the supporting sleeve 39.

Having described my invention, what I claim as new and wish to secure by Letters Patent is:

1. A device of the class described comprising an aligning plate, means in connection with said plate comprising vacuum cups to effect its attachment to a body, a supporting sleeve mounted upon said aligning plate, clutch members retained within said supporting sleeve, means for operating said clutch members, a horizontal leveling arm slidably mounted within said sleeve, a scale member mounted within said leveling arm, a vertical slide member connected to one end of said leveling arm, a vertical measuring arm slidably mounted within said slide member, a marker foot connected to the lower extremity of said vertical measuring arm, and a retractable marker mounted within said foot.

2. A device of the class described including an aligning plate, means in connection with said plate comprising vacuum cups to effect its attachment to a body, a supporting sleeve mounted upon said aligning plate, clutch members retained within said supporting sleeve, means for operating said clutch members, a horizontal leveling arm slidably mounted within said sleeve, a spool wound measuring tape connected to a clutch member, a vertical slide member connected to one end of said leveling arm, a vertical measuring arm slidably mounted within said slide member, a marker foot connected to the lower extremity of said vertical measuring arm, and a retractable marker mounted within said foot.

3. A device of the class described comprising a leveling slide including an aligning plate, a handle attached to said plate, means in connection with said plate adapted to effect its attachment to a body, a supporting sleeve mounted upon said aligning plate, clutching means rotatably mounted within said supporting sleeve, means for operating said clutching means, a horizontal leveling arm slidably mounted within said sleeve, a slidable scale member mounted within said leveling arm, a vertical slide member connected to one end of said leveling arm, a vertical measuring arm slidably mounted within said slide member, a marker foot connected to the lower extremity of said vertical measuring arm, and a retractable marker mounted within said foot.

4. A device of the class described comprising a leveling slide including an aligning plate having an adjusting handle, means in connection with said plate comprising vacuum cups to effect its attachment to a body, a supporting sleeve mounted upon said aligning plate, level indicators mounted upon said supporting sleeve, clutch members retained within said supporting sleeve, means connected with the handle for operating said clutch members, a horizontal leveling arm slidably mounted between said clutch members, a scale member slidably mounted within said horizontal leveling arm, a vertical slide member provided with a viewing window connected to one end of said horizontal leveling arm, a vertical measuring arm provided with an adjusting handle and slidably mounted within said slide member, a marker foot connected to the lower extremity of said vertical measuring arm, a retractable marker mounted within said foot, and means including a Bowden wire and a bell crank lever contained within said handle and connected with said marker for operating the same.

5. A device of the class described comprising an aligning plate, means in connection with said plate to effect its attachment to a body, a handle connected to said aligning plate, said handle including side members provided with centrally aligned circular openings, supporting sleeve members attached to said side members adjacent the perimeter of said openings therein to form a supporting sleeve, clutch members mounted within said sleeve, a horizontal leveling arm mounted between said clutch members, a finger operated lever pivotally mounted between said side members and adapted to control the operation of said clutch members, a vertical slide member connected to one end of said leveling arm, a vertical measuring arm slidably mounted within said slide member, a marker foot connected to the lower extremity of said vertical measuring arm, and a retractable marker mounted within said foot.

ALFRED A. DE LORIMIER.